Patented Apr. 17, 1951

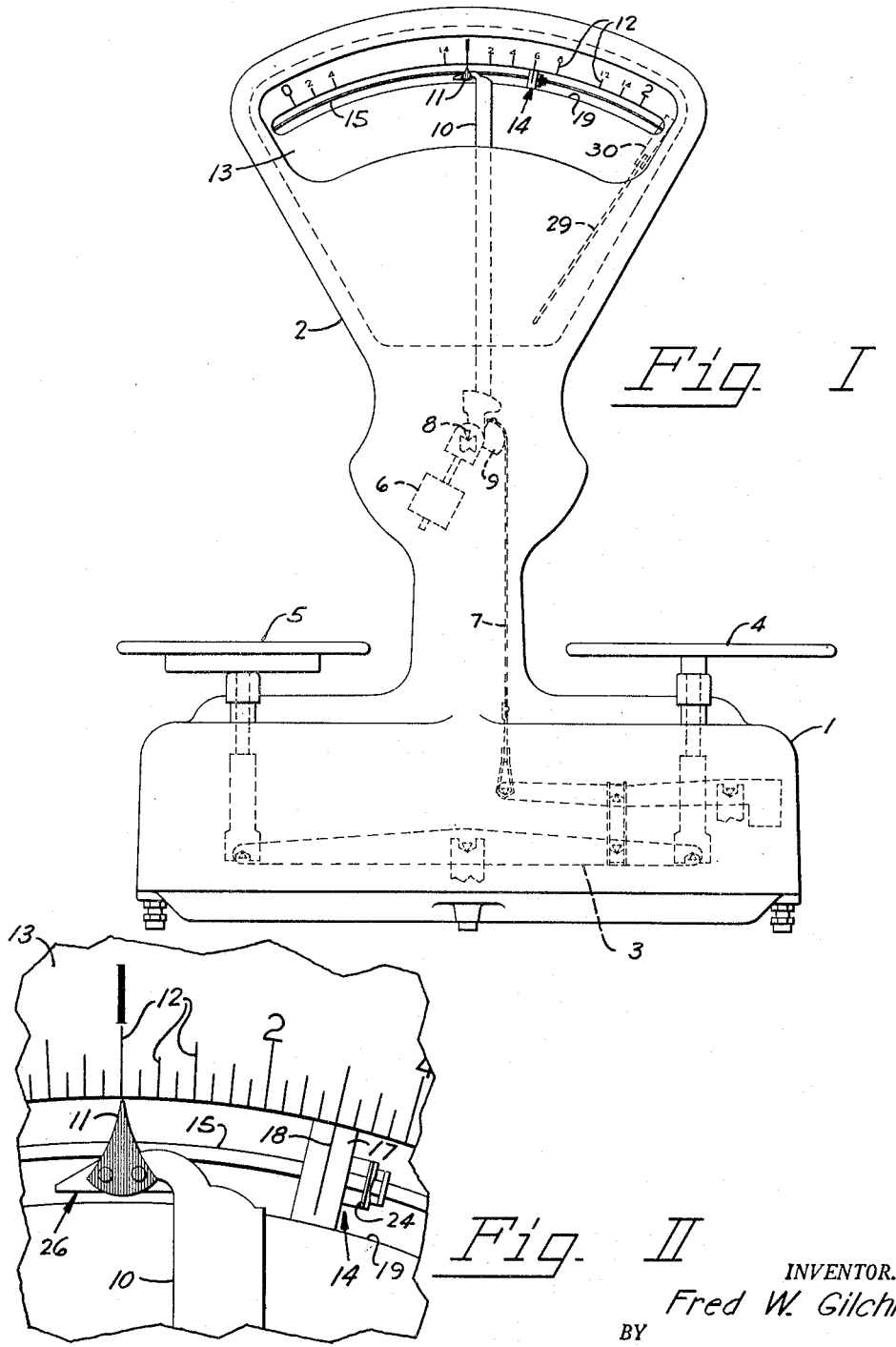

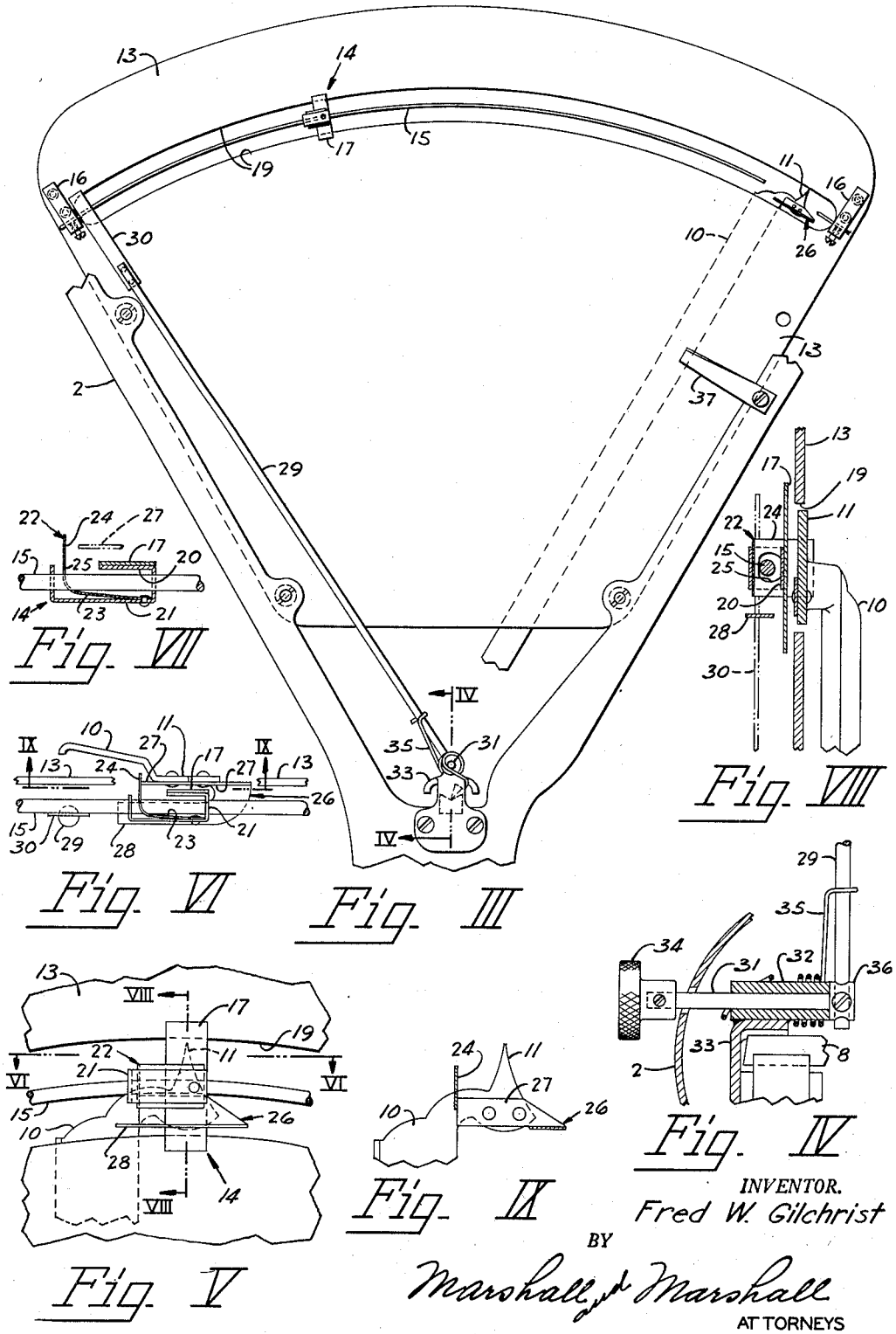

2,549,190

UNITED STATES PATENT OFFICE 2,549,190

WEIGHING SCALE INDICATOR

Fred W. Gilchrist, Toledo, Ohio, assignor to Toledo Scale Company, Toledo, Ohio, a corporation of New Jersey Application May 19, 1945, Serial No. 594,737

4 Claims. (Cl. 116—129)

This invention relates to weighing scale indicators and in particular to a maximum load indicator for use in a sensitive fan scale.

Maximum load indicators when applied to weighing scales introduce small errors in the weight indication because of their friction. It is desirable that the friction be made as low as possible, yet it may be made so small that the indicator will not remain in position but will move away from the correct indication if the weighing scale housing is bumped or subjected to vibration. It is possible to satisfactorily add maximum load indicators to dial scales because a relatively large amount of power is available to overcome their friction. Previous attempts to provide maximum load indicators for fan scales have met with failure because of the small amount of power available at the indicator and the resulting large errors due to variations in friction of the maximum load indicator.

The object of this invention is to provide a maximum load indicator for a fan scale, which indicator has sufficient friction to prevent erratic movement yet whose friction is sufficiently small so as to introduce negligible error into the weight indications.

Another object of the invention is to provide braking means for a maximum load indicator which braking means are releasable by a weighing indicator.

These and other objects and advantages are attained according to the invention by providing a track fashioned of wire or similar material that lies parallel to the path of the weighing scale indicator and a slider or maximum load indicator mounted on the track in such a manner that the weighing scale indicator may engage and drive the slider along the track. The slider is made as light as possible and is provided with spring means which engage the track to provide a slight amount of friction to hold the slider in position. The spring is so shaped that when it is engaged by the weighing scale indicator to move the slider along the track it tends to relieve the pressure with which the spring engages the track. In this manner sufficient friction is obtained to hold the slider accurately in position and yet the friction is sufficiently reduced so that it does not affect the accuracy of weight indication.

The invention as embodied in a weighing scale is illustrated in the accompanying drawings in which:

Figure I is a front elevation of a weighing scale embodying the invention.

Figure II is an enlarged fragmentary view showing a portion of the chart, a tip of the weighing indicator and the maximum load indicator as seen from the front of the scale.

Figure III is an elevation of the back side of the indicator housing with parts broken away so as to show the resetting mechanism used with the maximum load indicator.

Figure IV is an enlarged sectional view taken substantially along the line IV—IV of Figure III showing the mounting of the resetting mechanism.

Figure V is a fragmentary detail showing the tip of the weighing scale indicator engaged with the maximum load indicator as seen from the back of the scale.

Figure VI is a fragmentary plan view showing the engagement of the weighing scale indicator and the maximum load indicator as seen from the line VI—VI of Figure V.

Figure VII is a plan view of the maximum load indicator.

Figure VIII is a fragmentary vertical section taken along the line VIII—VIII of Figure V.

Figure IX is a fragmentary view of the tip of the weighing scale indicator as seen from the line IX—IX of Figure VI.

These specific drawings and the accompanying description merely illustrate a preferred form of the invention and are not intended to impose limitations on the claims.

The improved form of maximum load indicator is incorporated in a weighing scale of the even arm type as shown in Figure I. This scale comprises a base housing 1 and a pendulum and indicator housing 2 erected thereon. A lever system 3 mounted in the base 1 supports a load receiving platform 4 and a counterweight receiving platform 5. In this arrangement a major part of the weight of the load on the receiving platform 4 may be counterbalanced by known weights applied to the counterweight platform 5 while the excess not so counterbalanced is counterbalanced by a pendulum 6 connected to the lever system 3 through a flexible tape 7. The pendulum 6 is supported on a knife edge 8, is provided with a sector shaped cam 9 to which the flexible tape 7 is attached, and is further provided with an indicator portion 10 whose index tip 11 cooperates with indicia 12 on a chart 13 to indicate the magnitude of the load being counterbalanced by the pendulum 6.

To permit the weighing scale to be used to register the maximum force sustained by a test specimen prior to failure the weighing scale shown in Figure I is provided with a maximum load indicator assembly 14. The maximum load indicator 14 adapted to slide along a wire track 15 which at each end of the chart is securely held in brackets 16. The wire track 15 strictly conforms to the curve of the reading line of the chart 13 and lies parallel thereto and slightly to the rear of the plane of the chart. The maximum load indicator 14 lies entirely behind the chart 13 and is equipped with a flat front face 17 on which an index line 18 is inscribed, which is visible through an arcuate slot 19 cut in the chart 13 along its reading line.

The front face 17 of the maximum load indicator 14 is mounted on an inturned end 20 of a U-shaped slider 21 (shown in detail in Figure VII). Holes through the legs of the U-shaped slider 21 allow it to be threaded onto the wire track 15 in such position that the front face 17 lies parallel to and immediately behind the slot 19 in the chart 13. A spring brake 22 formed by bending a piece of flat stock into an L-shape is riveted to the bottom of the U-shaped slider 21 such that its long arm 23 lies parallel to the bottom of the U and its short leg 24 lies generally parallel to the short leg of the slider. A hole 25 cut in the short leg 24 of the L-shaped spring brake 22 accommodates the wire track 15. The spring brake 22 is tensioned so that its long arm 23 rests lightly against the wire track 15 so as to prevent the indicator assembly 14 from freely sliding along the track 15. The indicator assembly 14 is driven along the track 15 by pushing against the short arm 24 of the L-shaped spring. The pushing force is in such a direction that it tends to relieve the spring pressure against the track 15 to permit the indicator assembly to slide forward freely as long as there is contact between the short arm 24 of the spring and the weighing scale indicator 10.

The tip of the weighing scale indicator 10 behind its index portion 11 is provided with a U-shaped hook 26. The hook 26 is fashioned by cutting a U-shaped piece from flat stock, then bending the bottom of the U adjacent one leg 27 about a line parallel to length such that the plane of the leg 27 lies perpendicular to the plane of the bottom of the U and the remaining leg 28. The up-turned leg 27 is riveted to the rear surface of the indicator tip 11 such that the remaining leg 28 extends through the slot 19 in position to pass behind the lower end of the front face 17 of the maximum load indicator 14. The end of the up-turned leg 27 is adapted to strike the short leg 24 of the spring brake 22 so as to drive the maximum load indicator along with the weighing scale indicator 10. This driving engagement which permits registration of the index line 18 and the index 11 is most clearly shown in Figure VI.

The maximum load indicator 14 is thus adapted to be positioned anywhere along the track 15 by movement of the indicator 10. The operation is performed by the indicator 10 advancing so that the arm 28 of the hook 26 passes behind the front face 17 of the maximum load indicator 14 thereby ensuring that the up-turned leg 27 of the hook positively engages the end 24 of the L-shaped brake spring 22 to release the brake and allow the maximum load indicator 14 to freely slide along the track 15.

After the reading of the maximum load indicator 14 has been noted the indicator 14 must be returned to a point near zero on the chart in preparation for the next cycle of operation. A reset sweep 29 mounted in the indicator housing 2 behind the lower portion of the chart 13 terminates in a flat spring 30 adapted to slide along the wire track 15 and push the indicator 14 towards zero. The sweep 29 is carried on a shaft 31 which is journaled in a short sleeve 32 soldered or otherwise secured to the top of a pivot retainer 33 of the weighing scale mechanism. The exterior end of the shaft 31 is provided with a knob 34 to permit easy manipulation. A wire spring 35 coiled around a portion of the sleeve 32 engages the pivot retainer 33 and the sweep arm 29 and is tensioned to urge the sweep arm 29 away from the zero end of the chart 13. The spring 35 also serves to hold a coupling 36 by which the sweep arm 29 is held to the shaft 31 closely in contact with the journaling sleeve 32. The spring 35 prevents the return sweep from being inadvertently left in such a position that it would interfere with the normal operation of the scale.

To prevent any damage to the scale by improper use of the reset sweep 29 its travel toward the zero end of the scale is limited by a stop 37. The stop 37 is a piece of strip stock secured to the frame of the indicator housing 2 and projects lengthwise toward the path of the reset sweep 29. It is given a twist about its longitudinal axis so that its free end lies transverse the plane of movement of the reset sweep 29 and is therefore adapted to positively engage the sweep to prevent any overtravel thereof.

The objects of the invention are attained in this simple maximum load indicator because those parts which must be moved by the indicator are light in weight and the friction between the maximum load indicator and the track on which it runs is reduced during the time the maximum load indicator is being driven by the weighing scale indicator.

Having described the invention, I claim:

1. In a device of the class described, in combination, an automatic weighing scale having a generally fan-shaped chart and an indicator movable thereover, a track mounted on the chart and extending along the path of the indicator, an index slidably mounted on said track, a resilient member on said index that frictionally engages the track and that has a portion extending into the path of the indicator, said indicator being adapted to engage said portion to reduce the friction between said member and said track and to move said index along said track.

2. In a device of the class described, in combination, an automatic weighing scale having a chart and an indicator, said chart having indicia disposed along the edge of an arcuate slot extending along the path of the indicator, an offset tip on said indicator adapted to lie in said slot, a track secured to the back of the chart and extending along the slot, an index mounted on said track adjacent to and visible through said slot, a resilient member in said index for frictionally engaging said track, said resilient member projecting into the path of the indicator and being adapted to reduce its frictional engagement with the track when engaged by the indicator whereby said indicator may drive said index along said track.

3. In a maximum load indicator for an automatic weighing scale employing a movable indicator, a track positioned closely parallel to the path of the indicator, said track being supported only at its ends, and a slider mounted on said track, said slider comprising a formed U-shaped member having openings in its sides which engage said track, and a spring secured to said member and adapted to frictionally engage said track.

4. In a maximum load indicator for an automatic weighing scale employing a movable indicator, a track positioned closely parallel to the path of the indicator, said track being supported only at its ends, and a slider mounted on said track, said slider comprising a formed U-shaped member having openings in its sides which engage said track, and a spring secured to said member in position to frictionally engage said track and to be deflected from its track engaging position when contacted by said movable indicator.

FRED W. GILCHRIST.

REFERENCES CITED

The following references are of record in the file of this patent:

UNITED STATES PATENTS

| Number | Name | Date |
| --- | --- | --- |
| 624,993 | Swoboda | May 16, 1899 |
| 640,466 | Harris | Jan. 2, 1900 |
| 1,421,501 | Kraft et al | July 4, 1922 |
| 1,464,772 | Paine | Aug. 14, 1923 |
| 1,485,429 | Powell | Mar. 4, 1924 |
| 1,606,936 | Hapgood | Nov. 16, 1926 |
| 1,663,983 | Hapgood | Mar. 27, 1928 |
| 1,845,098 | Pollack | Feb. 16, 1932 |
| 1,889,719 | Wende | Nov. 29, 1932 |
| 1,908,833 | Fryer | May 16, 1933 |
| 2,080,165 | Cox | May 11, 1937 |
| 2,323,734 | Stokes | July 6, 1943 |
| 2,365,962 | Kahn | Dec. 26, 1944 |

FOREIGN PATENTS

| Number | Country | Date |
| --- | --- | --- |
| 522,149 | Germany | Mar. 31, 1931 |
| 478,091 | Great Britain | Feb. 1, 1937 |